United States Patent
Shin et al.

(10) Patent No.: US 9,832,800 B2
(45) Date of Patent: Nov. 28, 2017

(54) METHOD AND APPARATUS FOR DEVICE TO DEVICE COMMUNICATION

(71) Applicant: Electronics and Telecommunications Research Institute, Daejeon (KR)

(72) Inventors: Wooram Shin, Daejeon (KR); Changhee Lee, Seoul (KR); Sung-Hyun Moon, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 216 days.

(21) Appl. No.: 14/818,418

(22) Filed: Aug. 5, 2015

(65) Prior Publication Data

US 2016/0044666 A1 Feb. 11, 2016

(30) Foreign Application Priority Data

Aug. 8, 2014 (KR) .................. 10-2014-0102571
Jul. 17, 2015 (KR) .................. 10-2015-0101678

(51) Int. Cl.
| | |
|---|---|
| H04L 12/50 | (2006.01) |
| H04W 76/02 | (2009.01) |
| H04W 72/12 | (2009.01) |
| H04W 28/18 | (2009.01) |
| H04W 92/18 | (2009.01) |

(52) U.S. Cl.
CPC ..... *H04W 76/023* (2013.01); *H04W 72/1278* (2013.01); *H04W 28/18* (2013.01); *H04W 92/18* (2013.01)

(58) Field of Classification Search
CPC .................................................. H04W 76/023

USPC ......................................................... 370/339
See application file for complete search history.

(56) References Cited

U.S. PATENT DOCUMENTS

| | | | |
|---|---|---|---|
| 2012/0163252 A1 | 6/2012 | Ahn et al. | |
| 2014/0087744 A1 | 3/2014 | Yang et al. | |
| 2015/0326373 A1* | 11/2015 | Ryu | H04L 5/0073 370/330 |

FOREIGN PATENT DOCUMENTS

WO     2014107091 A1     7/2014

OTHER PUBLICATIONS

3GPP TS 36.211 V12.5.0, "Physical channels and modulation", (Mar. 2015), Release 12.
3GPP TS 36.212 V12.4.0, "Multiplexing and channel coding", (Mar. 2015), Release 12.

(Continued)

*Primary Examiner* — Dang Ton
(74) *Attorney, Agent, or Firm* — William Park & Associates Ltd.

(57) ABSTRACT

A first terminal receives a first Timing Advance (TA) value from a base station and includes a second TA value that is obtained based on the first TA value in a Scheduling Assignment (SA) signal. The first terminal transmits the SA signal to a second terminal at downlink (DL) timing for receiving a downlink signal of the base station in cellular communication. When a length of a Cyclic Prefix (CP) that is set for the D2D communication and a length of a CP that is set for the cellular communication are different, the first terminal transmits data of the D2D communication to the second terminal at first timing that is obtained by applying the second TA value to the DL timing.

20 Claims, 5 Drawing Sheets

(56) References Cited

OTHER PUBLICATIONS

3GPP TS 36.213 V12.5.0, "Physical layer procedures", (Mar. 2015), Release 12.
R1-143053, "Discussion on Transmission Timing of D2D Communication for In-coverage UEs", 3GPP TSG RAN WG1 Meeting #78, Aug. 18-22, 2014, Dresden, Germany.

* cited by examiner

METHOD AND APPARATUS FOR DEVICE TO DEVICE COMMUNICATION

CROSS-REFERENCE TO RELATED APPLICATION

This application claims priority to and the benefit of Korean Patent Application Nos. 10-2014-0102571 and 10-2015-0101678 filed in the Korean Intellectual Property Office on Aug. 8, 2014 and Jul. 17, 2015, the entire contents of which are incorporated herein by reference.

BACKGROUND OF THE INVENTION (a) Field of the Invention

The present invention relates to a Device to Device (D2D) communication method in which a terminal directly communicates with another terminal without passing through a base station, and an apparatus that supports the method.

(b) Description of the Related Art

A 3rd Generation Partnership Project (3GPP) standardization organization performs Rel-12 standardization for Device-to-Device (D2D) communication (or Sidelink transmission), which is direct communication between terminals based on a Long-Term Evolution (LTE) specification. D2D communication technology supports data being directly transmitted to an adjacent terminal without passing through a base station.

A D2D communication method, considered in 3GPP, includes mode 1 communication that receives allocation of a D2D transmitting resource by a base station or a repeater (or a relay station) and mode 2 communication in which a terminal directly selects a transmitting resource. Mode 1 communication may be used only by an in-coverage terminal, and mode 2 communication may be used by all of an in-coverage terminal, a partial-coverage terminal, and an out-of-coverage terminal. Here, a reference of in-coverage may include a case of satisfying a cell selection condition based on reference signal received power and/or reference signal received quality. The in-coverage terminal is a terminal that is located within cell coverage. The partial-coverage terminal is a terminal that receives only a synchronization signal and system information of a base station without existing within cell coverage. The out-of-coverage terminal is a terminal outside cell coverage that is not synchronized with a base station within a cell and that does not receive system information.

SUMMARY OF THE INVENTION

The present invention has been made in an effort to provide a method and apparatus for transmitting/receiving D2D communication having advantages of being capable of improving performance of D2D communication and cellular communication, when a resource for D2D communication and a resource for cellular communication are multiplexed in D2D communication.

An exemplary embodiment of the present invention provides a Device to Device (D2D) communication method in which a first terminal directly communicates with a second terminal. The D2D communication method includes: receiving a first Timing Advance (TA) value from a base station; including a second TA value that is obtained based on the first TA value in a Scheduling Assignment (SA) signal; transmitting the SA signal to the second terminal at downlink (DL) timing for receiving a downlink signal of the base station in cellular communication; and transmitting, when a length of a Cyclic Prefix (CP) that is set for the D2D communication and a length of a CP that is set for the cellular communication are different, data of the D2D communication to the second terminal at first timing that is obtained by applying the second TA value to the DL timing.

When a CP length for the D2D communication and a CP length for the cellular communication are the same, the D2D communication method may further include transmitting data of the D2D communication to the second terminal at second timing that is obtained by applying the first TA value to the DL timing.

Even if a first cell to which the first terminal belongs and a second cell to which the second terminal belongs have different cell coverage, a timing adjustment step size for the first cell may be the same as a timing adjustment step size for the second cell.

The transmitting of the SA signal may include including a first timing adjustment step size that is used by the first terminal in the SA signal.

The including of a first timing adjustment step size may include setting a value of 1 bit that is included in the SA signal to a value representing the first timing adjustment step size.

When the CP for the D2D communication is a normal CP, the first timing adjustment step size may be one of 16*sampling time and ½ of the normal CP length.

When the CP for the D2D communication is an extended CP having a longer length than that of the normal CP, the first timing adjustment step size may be one of ½ of the extended CP length and ¾ of the extended CP length.

The D2D communication method may further include transmitting a cell-specific reference signal for demodulating the SA signal to the second terminal.

A timing adjustment step size of a cell to which the first terminal belongs may be transmitted to the second terminal by the base station.

The transmitting of the SA signal may include including a terminal identifier of the first terminal that belongs to the first cell in the SA signal.

Terminal identifiers of terminals that belong to a first cell and a timing adjustment step size of the first cell may be transmitted to the second terminal by the base station.

The bit number representing the second TA value may be smaller than the bit number representing the first TA value.

The D2D communication method may further include receiving allocation of a resource for transmitting the SA signal and a resource for transmitting data of the D2D communication from the base station.

Another embodiment of the present invention provides a Device to Device (D2D) communication method in which a first terminal directly communicates with a second terminal. The D2D communication method may include: selecting a first resource for transmitting a Scheduling Assignment (SA) signal and a second resource for transmitting data of the D2D communication among resources; setting, when first timing for transmitting data of the D2D communication is set to downlink (DL) timing for receiving a downlink signal of a base station in cellular communication, a first Timing Advance (TA) value that is included in the SA signal to 0; and transmitting the SA signal to the second terminal using the first resource.

The D2D communication method may further include setting the first timing to the DL timing, when a Radio Resource Control (RRC) state of the first terminal is an RRC idle state as well as when a RRC state of the first terminal is an RRC connected state.

The D2D communication method may further include: setting, when an RRC state of the first terminal is an RRC connected state, the first timing to timing that is obtained by applying a first timing adjustment value to the DL timing; and setting, when an RRC state of the first terminal is an RRC idle state, the first timing to the DL timing.

The setting of the first timing to timing that is obtained by applying the first timing adjustment value to the DL timing may include: calculating, when a Cyclic Prefix (CP) length for the D2D communication and a CP length for the cellular communication are the same, the first timing adjustment value for obtaining Physical Uplink Shared Channel (PUSCH) transmitting timing based on a second TA value that is received from the base station; and calculating the first TA value based on the first timing adjustment value.

The setting of the first timing to timing that is obtained by applying the first timing adjustment value to the DL timing may include: calculating, when a CP length for the D2D communication and a CP length for the cellular communication are different, a second timing adjustment value for obtaining PUSCH transmitting timing based on a second TA value that is received from the base station; calculating the first TA value based on the second timing adjustment value; and calculating the first timing adjustment value based on the first TA value.

The transmitting of the SA signal may include including a first timing adjustment step size that is used by the first terminal in the SA signal.

The D2D communication method may further include including a first timing adjustment step size that is used by the first terminal in a synchronization channel of the D2D communication.

Yet another embodiment of the present invention provides a Device to Device (D2D) communication method in which a first terminal directly communicates with a second terminal. The D2D communication method include: receiving a Scheduling Assignment (SA) signal including a first Timing Advance (TA) value from the second terminal at first timing; acquiring a first timing adjustment step size from at least one of a first signal that is received through System Information Block (SIB) or Radio Resource Control (RRC) signaling of a base station, the SA signal, and a D2D communication synchronization channel that is received from the second terminal; calculating second timing using the first timing, the first TA value, and the first timing adjustment step size; and receiving data of the D2D communication at the second timing.

The acquiring of a first timing adjustment step size may include: determining, when a Cyclic Prefix (CP) for the D2D communication is a normal CP, a value corresponding to a value of 1 bit that is included in the SA signal among 16*sampling time and ½ of the normal CP length to the first timing adjustment step size having a unit of seconds; and determining, when a CP for the D2D communication is an extended CP having a longer length than that of the normal CP, a value corresponding to a value of 1 bit that is included in the SA signal among ½ of the extended CP length and ¾ of the extended CP length to the first timing adjustment step size having a unit of seconds.

DETAILED DESCRIPTION OF THE EMBODIMENTS

Figure 1:
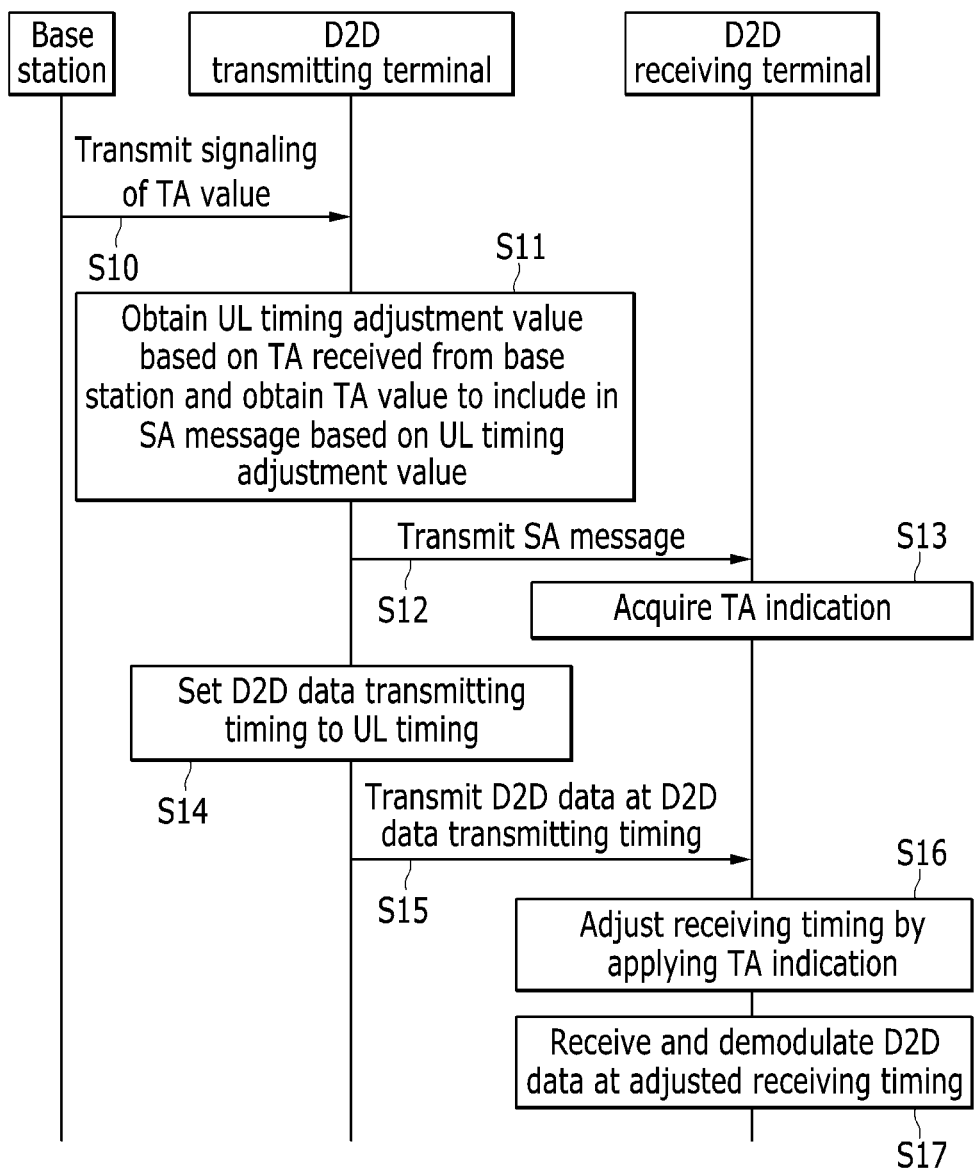
FIG. 1 is a flowchart illustrating a process of adjusting D2D transmitting/receiving timing.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In an entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a repeater, a relay station (RS) that performs a BS function, a high reliability relay station (HR-RS) that performs a BS function, a small BS, and a macro BS, and may include an entire function or a partial function of the ABS, the HR-BS, the nodeB, the eNodeB, the AP, the RAS, the BTS, the MMR-BS, the repeater, the RS, the HR-RS, the small BS, and the macro BS.

FIG. 1 is a flowchart illustrating a process of adjusting D2D transmitting/receiving timing.

In a mode 1 communication method or a mode 2 communication method, a transmitting terminal (hereinafter, a 'D2D transmitting terminal') for D2D communication transmits scheduling information including link adaptation information and resource allocation information for transmitting D2D data before transmitting D2D data through a Scheduling Assignment (SA) message (signal) (or Sidelink Control Information (SCI) format 0). SCI format 0 is transmitted through a Physical Sidelink Control Channel (PSCCH). Further, a Cyclic Redundancy Check (CRC) bit that is included in the SA message is scrambled using an L1 (physical layer) identifier. When a receiving terminal (hereinafter, a 'D2D receiving terminal') for D2D communication successfully decodes an SA message using an L1 identifier corresponding to a D2D group to which the receiving terminal belongs, the receiving terminal attempts reception of corresponding data using scheduling information that is included in the SA message.

As a resource (hereinafter, an 'SA resource') for transmitting/receiving the SA message and a resource (hereinafter, a 'D2D data resource') for transmitting/receiving D2D data, the D2D transmitting terminal and the D2D receiving terminal may use subframes of some of Uplink (UL) carriers of a Frequency Division Duplexing (FDD) frame or may use some of UL subframes of a Time Division Duplexing (TDD) frame. As a resource for D2D communication (hereinafter, a 'D2D communication resource', wherein the D2D communication resource includes an SA resource and a D2D data resource), the D2D transmitting terminal and the D2D receiving terminal may receive and use allocation of some of UL resources for cellular communication (or Wide Area Network (WAN) communication, data is transmitted via the base station). Therefore, multiplexing between a D2D communication resource and a resource for WAN communication (hereinafter, a 'WAN communication resource') is required, and from a terminal viewpoint, only Time Division Multiplexing (TDM) is supported, and from a system viewpoint, TDM and Frequency Division Multiplexing (FDM) may be simultaneously supported. For example, in the same subframe, a first terminal may transmit a UL control channel in a 0th Resource Block (RB), and a second terminal may transmit a D2D SA message or data in a tenth RB.

For D2D communication between terminals, two terminals should perform synchronization within a predetermined range. An in-coverage terminal receives a synchronization signal (or a synchronization signal and a reference signal) of a base station and performs synchronization (including frequency synchronization and time synchronization). In order to receive a Downlink (DL) signal of the base station upon performing WAN communication, the in-coverage terminal uses the synchronization that is adjusted in this way. Time synchronization that performed in this way is referred to as DL timing. DL timing is similar to propagation delay until a transmitting signal of the base station is received by the terminal, and a detection time of a first path may be defined as DL timing. Further, in order for the in-coverage terminal to transmit a UL to the base station, the in-coverage terminal transmits with advancing by the sum (hereinafter, a 'third UL timing adjustment value') of a timing offset value (hereinafter, a 'first UL timing adjustment value') that is obtained based on Timing Advance (TA) in which the base station signals based on DL timing and a fixed timing offset value (hereinafter, a 'second UL timing adjustment value'). Timing that is advanced in this way is referred to as UL timing. The first UL timing adjustment value is generally a value corresponding to about two times the propagation delay. The terminal may update the first UL timing adjustment value according to TA signaling in which the base station transmits, and the terminal may update the first UL timing adjustment value in consideration of changed DL timing. The latter may be applied with an implementation method. Hereinafter, D2D transmission of the in-coverage terminal will be described in detail. However, the D2D receiving terminal may be an in-coverage terminal, a partial-coverage terminal, or an out-of-coverage terminal.

In mode 1 communication (the terminal receives allocation of a D2D communication resource from the base station), SA transmitting timing (timing for transmitting an SA message) follows DL timing, and D2D data transmitting timing (timing for transmitting D2D data) follows UL timing. In order for the D2D transmitting terminal to notify the D2D receiving terminal of the difference between DL timing and UL timing thereof, the D2D transmitting terminal includes and transmits TA information in the SA message.

The D2D receiving terminal may determine a Fast Fourier Transform (FFT) window start point based on DL timing thereof and receive an SA message. Alternatively, when it is impossible to acquire DL timing, the D2D receiving terminal may acquire timing for receiving an SA message (hereinafter, 'SA receiving timing') from a D2D synchronization signal (or a sidelink synchronization signal) that is transmitted by another D2D terminal (that may be the D2D transmitting terminal). The D2D receiving terminal may determine an FFT window start point based on a time that is advanced by the sum (hereinafter, a 'third D2D receiving timing adjustment value') of a timing offset value (hereinafter, a 'first D2D receiving timing adjustment value') that is obtained based on TA that is included in the SA message from SA receiving timing thereof (e.g., DL timing or timing that is acquired from a D2D synchronization signal) and a fixed timing offset value (hereinafter, a 'second D2D receiving timing adjustment value') and may receive D2D data.

FIG. 1 illustrates such a process. Specifically, when the D2D transmitting terminal accesses the base station, the D2D transmitting terminal receives signaling of a TA value from the base station (S10).

The D2D transmitting terminal obtains a first UL timing adjustment value from the TA (hereinafter, 'base station TA') that receives signaling from the base station and obtains a TA value to include in an SA message based on the first UL timing adjustment value (S11). Here, the base station TA may be signaled in a bit form, and a base station TA value corresponding to the base station TA is a value in which signaled bits are converted to a decimal number.

The D2D transmitting terminal includes the TA value that is obtained at step S11 as TA indication (or TA information) in the SA message and transmits the SA message to the D2D receiving terminal (S12). Specifically, the D2D transmitting terminal transmits the SA message at DL timing. Here, TA indication may be signaled in a bit form, and a TA indication value corresponding to TA indication is a value in which signaled bits are converted to a decimal number.

The D2D transmitting terminal sets D2D data transmitting timing to UL timing (S14).

The D2D transmitting terminal transmits D2D data at D2D data transmitting timing that is set at step S14 (S15).

The D2D receiving terminal receives the SA message from the D2D transmitting terminal (S12).

The D2D receiving terminal acquires TA indication from the received SA message (S13).

When receiving D2D data, the D2D receiving terminal sets a time that is advanced by a third D2D receiving timing adjustment value, which is the sum of a first D2D receiving timing adjustment value and a second D2D receiving timing adjustment value that are obtained based on TA indication from SA receiving timing (timing for receiving the SA message) to D2D data receiving timing (timing for receiving D2D data) (S16).

The D2D receiving terminal receives and demodulates D2D data at D2D data receiving timing that is set at step S16 (S17).

Figure 2:
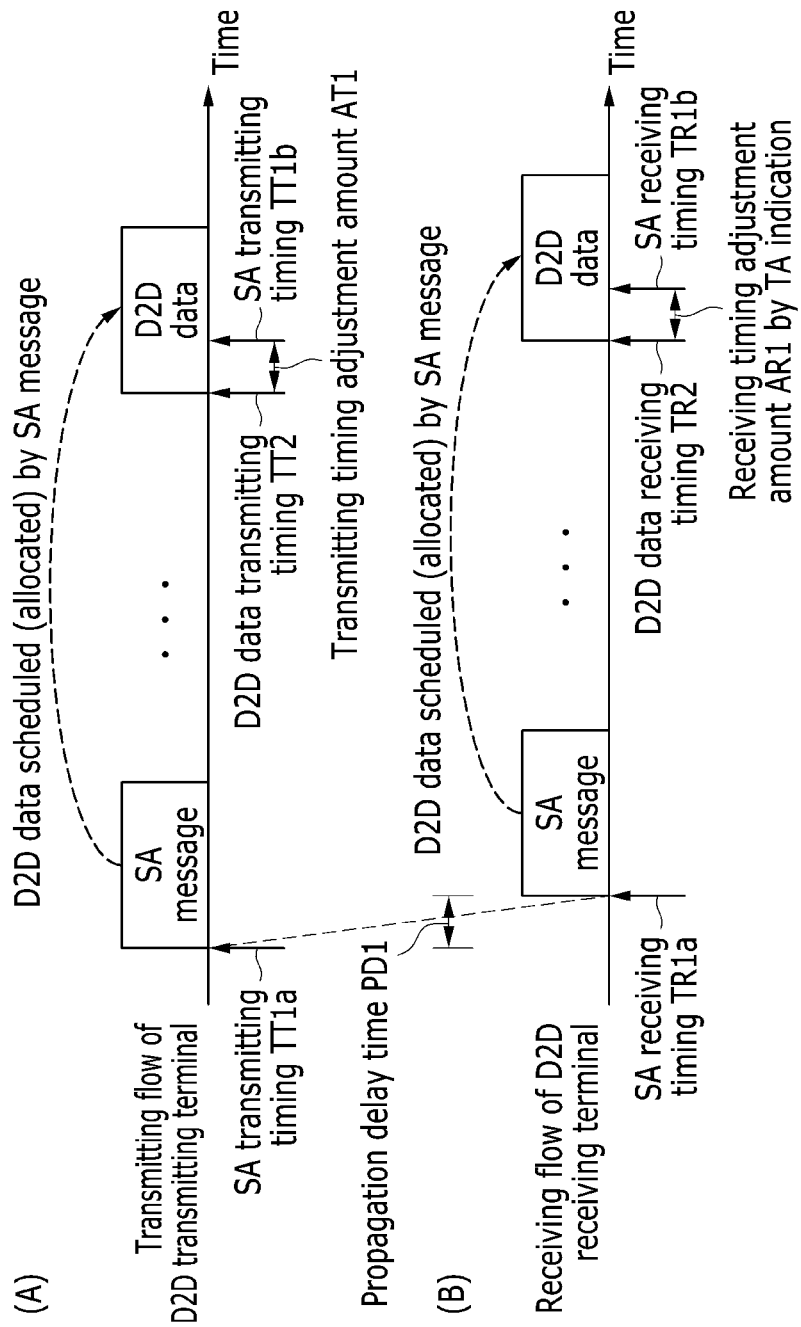
FIG. 2 is a diagram illustrating transmitting/receiving timing that is applied to an SA message and D2D data.

FIG. 2 is a diagram illustrating transmitting/receiving timing that is applied to an SA message and D2D data. Specifically, FIG. 2 (A) illustrates flow in which the D2D transmitting terminal transmits an SA message and D2D data (D2D data that is scheduled by the SA message), and FIG. 2 (B) illustrates flow in which the D2D receiving terminal receives an SA message and D2D data.

The reason of setting D2D data transmitting timing to UL timing is to match a receiving time of a D2D communication signal and a time at which the base station receives a UL WAN signal (UL signal in WAN communication) with a value within a predetermined range, when a resource for D2D communication and WAN communication becomes FDM. When an arrival time of signals that are simultaneously received from several terminals by the base station is generally deviated by a half or more of a Cyclic Prefix (CP) length, Inter-Symbol Interference (ISI) (or Inter-Carrier Interference (ICI) according to ISI) may occur. In order to prevent this, when an in-coverage terminal transmits D2D data, it is preferable that the in-coverage terminal uses UL timing.

The D2D transmitting terminal includes TA information in the SA message and transmits the SA message at SA transmitting timing TT1$a$. The SA transmitting timing TT1$a$ follows DL timing. TA information that is included in the SA message has a limited bit size due to restriction of an SA message size. For example, TA indication that is included in the SA message may have a size smaller than 11 bits (e.g., 6 bits).

A TA (hereinafter, 'first base station TA') in which the base station signals the terminal through a Random Access Response (RAR) Media Access Control (MAC) payload has a size of 11 bits, and a corresponding TA value has a range from 0 to 1282. Further, a TA (hereinafter, 'second base station TA') in which the base station signals the terminal through a Timing Advance Command (TA command) MAC Control Element (CE) has a size of 6 bits, and a corresponding TA value has a range from 0 to 63. For two kinds of TA (first base station TA and second base station TA), granularity of TA has a value of 16·Ts (unit: seconds) or 16 (unit: Ts). When a unit is not particularly specified, a unit of granularity of TA that is described hereinafter is assumed to be Ts. Here, Ts is a sampling time and is defined to 1/30720000 of a second(s).

In order to obtain UL timing, the D2D transmitting terminal obtains N_TA, which is a first UL timing adjustment value, from the base station TA. Here, an N_TA value has a range from 0 to 20512 as an integer. Specifically, when the D2D transmitting terminal receives signaling of the first base station TA, the D2D transmitting terminal substitutes first base station TA×16 to N_TA (i.e., N_TA=first base station TA value×16). Alternatively, when the D2D transmitting terminal receives signaling of second base station TA, the D2D transmitting terminal adds (second base station TA value−31)×16 to a present N_TA value, thereby updating the N_TA value to a new value. DL timing was changed, but when the D2D transmitting terminal does not receive signaling of the base station TA from the base station, if compensation for the changed DL timing is not sufficiently performed, the D2D transmitting terminal itself may update the N_TA value. The D2D transmitting terminal uses a time that is advanced by (N_TA+N_TA_offset1)×Ts from DL timing as UL timing. Here, N_TA_offset1 is set to 0 as a second UL timing adjustment value at FDD and is set to 624 as a second UL timing adjustment value at TDD.

The D2D transmitting terminal transmits an SA message at SA transmitting timing TT1$a$. The D2D transmitting terminal sets SA transmitting timing to DL timing. The D2D transmitting terminal sets D2D data transmitting timing TT2 to UL timing. Therefore, a difference AT1 between D2D data transmitting timing TT2 and SA transmitting timing TT1$b$ corresponds to a third UL timing adjustment value.

The D2D receiving terminal receives an SA message from the D2D transmitting terminal at SA receiving timing TR1$a$. The SA receiving timing TR1$a$ is approximately a time that has elapsed by a propagation delay time PD1 from SA transmitting timing TT1$a$. The SA receiving timing TR1$a$ follows DL timing or when DL timing cannot be acquired, the SA receiving timing TR1$a$ may be acquired from a D2D synchronization signal that is transmitted by another D2D terminal (that may be the D2D transmitting terminal). The D2D receiving terminal adjusts D2D data receiving timing based on TA indication that is acquired from the SA message. Specifically, the D2D receiving terminal may set a time that is advanced by (TA indication value×TA granularity+ N_TA_offset2)×Ts, which is a third D2D receiving timing adjustment value from SA receiving timing TR1$b$ to D2D data receiving timing TR2. Here, (TA indication value×TA granularity) corresponds to a first D2D receiving timing adjustment value, and N_TA_offset2 corresponds to a second D2D receiving timing adjustment value. When the D2D receiving terminal is an in-coverage terminal, if a cell to which the D2D receiving terminal belongs is set to FDD, N_TA_offset2 is set to 0, and if a cell to which the D2D receiving terminal belongs is set to TDD, N_TA_offset2 is set to 624. When the D2D receiving terminal does not receive system information from an around base station, N_TA_offset2 is set to 0. For example, when TA granularity is set to 16, the D2D receiving terminal belonging to the FDD cell uses a time that is advanced by (TA indication value×16+N_TA_offset2)×Ts, which is a third D2D receiving timing adjustment value from SA receiving timing as D2D data receiving timing. The D2D receiving terminal receives D2D data at D2D data receiving timing TR2.

When TA indication that is transmitted through the SA message has granularity of 16 and has a size of less than 11 bits, the TA indication cannot represent a timing adjustment value corresponding to cell coverage of a maximum of 100 km that is supported in an LTE specification. Therefore, granularity of TA may be set based on coverage of a cell to which the D2D terminal belongs. One of such setting methods is a method in which the base station sets one of 16·Ts, ½ of a Normal CP (hereinafter, 'NCP') length, ½ of an Extended CP (hereinafter, 'ECP') length, and ¾ of an ECP length to a value of TA granularity (unit: seconds). When changing a unit of TA granularity from seconds to Ts, a TA granularity value using seconds as a unit is divided into Ts and a divided result thereof is rounded down. Thereby, a TA granularity value using Ts as a unit may be generated. The base station may transmit TA granularity that is set in this way to the D2D terminal through System Information Block (SIB) or RRC signaling, and the D2D terminal may use the TA granularity.

In order for a base station of each cell to have optimal performance of UL WAN reception or D2D reception thereof, the base station may set TA granularity to have a smallest step size while including cell coverage (while supporting maximum cell coverage). When adjacent cells have different coverage, terminals that belong to different cells may receive setting of different TA granularity. In such a case, even if the D2D receiving terminal successfully decodes an SA message of a D2D transmitting terminal that belongs to a cell adjacent thereto, the D2D receiving terminal may interpret TA indication that is included in the SA message to be different from that which is applied to the D2D transmitting terminal due to different TA granularity. Thereby, the D2D receiving terminal may not successfully decode D2D data or should be able to conduct decoding with readjusting a receiving FFT window start point through an additional operation. Hereinafter, a method of solving this will be described in detail. Further, a method of adjusting D2D data transmitting timing according to whether the difference exists between a CP length for WAN communication and a CP length for D2D communication will be described in detail.

In mode 2 communication (the terminal directly selects a D2D communication resource), SA transmitting timing follows DL timing, as in mode 1 communication. Hereinafter, in mode 2 communication, a method of adjusting D2D data transmitting timing for optimally setting D2D performance and UL WAN performance according to a Radio Resource Control (RRC) state of the terminal will be described in detail. Further, in mode 2 communication, a method of adjusting D2D data transmitting timing according to whether the difference exists between a CP length for WAN communication and a CP length for D2D communication will be described in detail. In addition, when the D2D receiving terminal does not equally set TA granularity to TA granularity of the D2D transmitting terminal, D2D data receiving performance may be degraded, and a method of solving this is described in detail.

First, transmitting timing in mode 1 communication will be described.

As described above, in mode 1 communication, the D2D transmitting terminal follows DL timing as SA transmitting timing and follows UL timing as D2D data transmitting timing. UL timing (UL timing that is calculated using a UL timing adjustment value that is obtained based on the base station TA, e.g., UL timing that is calculated using N_TA) according to the base station TA is used for transmitting a Physical Uplink Shared Channel (PUSCH), and hereinafter, UL timing according to the base station TA is referred to as PUSCH timing. PUSCH timing is distinguished from timing (timing obtained based on TA indication) according to TA indication. The base station TA may have granularity of 16, but TA indication in which the D2D transmitting terminal transmits through an SA message may have granularity of a value exceeding 16 according to cell coverage.

The D2D transmitting terminal selects a value closest to PUSCH timing as TA indication that transmits through an SA message. Specifically, the D2D transmitting terminal may select a value closest to an N_TA value that is used for calculating PUSCH timing among TA indication candidates that can be included in the SA message. More specifically, the D2D transmitting terminal may calculate (a value of TA indication candidate×TA granularity) for TA indication candidates, determine a value closest to an N_TA value that is used when calculating PUSCH timing among calculated values, and include a TA indication candidate that is used for the determined value in the SA message. Alternatively, the D2D transmitting terminal may determine TA indication using Equation 1.

$$\text{TA indication value}=\text{floor}(N\_TA/\text{TA granularity}) \quad \text{[Equation 1]}$$

In Equation 1, floor( ) is a rounding down function, N_TA is a first UL timing adjustment value that is used when calculating PUSCH timing, and TA granularity is TA granularity that is used by the D2D transmitting terminal.

The D2D transmitting terminal includes and transmits TA indication that is selected or determined in this way in the SA message. Therefore, the D2D transmitting terminal transmits D2D data at PUSCH timing, and when the D2D receiving terminal determines a receiving FFT window start point (or D2D data receiving timing) based on TA indication that is included in the SA message for D2D data reception, an error (unit: Ts) corresponding to ½ of maximum TA granularity may occur. When the D2D transmitting terminal sets D2D transmitting timing based on TA indication transmitted through the SA message, D2D data receiving timing that is set by the D2D receiving terminal may not produce the error or may reduce the error. Thereby, the D2D receiving terminal can receive D2D data while lowering complexity, and D2D receiving performance can be improved. However, compared with a case of setting D2D transmitting timing with PUSCH timing, in a case of setting D2D transmitting timing based on TA indication, D2D data may be transmitted in a deviated state to the maximum by a ½ value (unit: Ts) of granularity, and thus when UL WAN is received, interference occurs or collision occurs with a final Orthogonal Frequency Division Multiplexing (OFDM) symbol of a previous subframe and UL WAN receiving performance may thus be deteriorated.

The D2D transmitting terminal may determine whether the difference exists in a CP length of D2D communication and a CP length of WAN communication, and determine D2D data transmitting timing according to a determination result thereof.

When CP lengths of D2D communication and UL WAN communication are differently set, D2D transmission may be subject to ICI upon receiving UL WAN, and this may be mitigated by setting a power control or a guard band. Therefore, when CP lengths of D2D communication and UL WAN communication are differently set, in order to improve D2D receiving performance, the D2D transmitting terminal sets D2D data transmitting timing to timing according to TA indication (timing calculated using TA indication included in the SA message, hereinafter, 'TA indication UL timing') instead of PUSCH timing. Specifically, TA indication UL timing is a time that is advanced by (TA indication value×TA granularity+N_TA_offset1)×Ts from SA transmitting timing (or DL timing). When CP lengths of D2D communication and UL WAN communication are equally set, the D2D transmitting terminal uses PUSCH timing as D2D data transmitting timing.

In mode 1 communication, TA granularity may be set according to cell coverage, and when different TA granularity is set to adjacent cells having different cell coverage, the D2D receiving terminal may interpret TA indication that is included in an SA message that the D2D transmitting terminal that belongs to a cell adjacent thereto transmits to be different from the D2D transmitting terminal. Thereby, data receiving performance may be degraded. In order to resolve this, four methods may be used.

A first method is a method of setting TA granularity of cells to the same value, even if cell coverage of cells is different. For example, TA granularity may be set to each cell with a value that can support widest cell coverage or average cell coverage. According to the first method, the D2D receiving terminal can interpret TA indication that a D2D transmitting terminal that belongs to an arbitrary cell transmits without an error and can use the TA indication when receiving D2D data.

A second method is a method in which the D2D transmitting terminal transmits a cell-specific reference signal as a reference signal for demodulation of an SA message and in which the base station transmits TA granularity of a cell adjacent to the D2D receiving terminal to the D2D receiving terminal through SIB or RRC signaling. According to the second method, when the D2D receiving terminal successfully decodes an SA message, the D2D receiving terminal determines to which cell a D2D terminal that has transmitted an SA message belongs based on a cell specific reference signal that is used for decoding the SA message. The D2D receiving terminal acquires TA granularity information of an adjacent cell from SIB or RRC signaling of the base station. The D2D receiving terminal searches for TA granularity of the D2D transmitting terminal having transmitted the SA message from the acquired TA granularity information. When receiving D2D data, the D2D receiving terminal uses the found TA granularity.

A third method is a method in which the D2D transmitting terminal includes and transmits TA granularity used by itself in an SA message. According to the third method, when the D2D receiving terminal receives the SA message, the D2D receiving terminal acquires TA granularity from the SA message and uses the acquired TA granularity when receiving D2D data. An overhead for transmitting TA granularity information through the SA message can be mitigated through association with other information. For example, it is assumed that a TA granularity value (unit: seconds) that may be set to one cell is one of 16·Ts, ½ of an NCP length, ½ of an ECP length, and ¾ of an ECP length, as described above. When a CP for D2D communication is an NCP, one of 16·Ts and ½ of an NCP length may be allocated as a TA granularity value (unit: seconds) to a cell. Alternatively, when a CP for D2D communication is an ECP, one of ½ of an ECP length and ¾ of an ECP length may be allocated as a TA granularity value (unit: seconds) to the cell. When an entire cell sets a CP length for D2D communication to the same value or when the base station notifies the D2D receiving terminal of a CP length for D2D communication of a cell adjacent to the D2D transmitting terminal through SIB or RRC signaling, the D2D transmitting terminal may represent TA granularity information that is included in the SA message with only 1 bit. For example, when it is assumed that a CP for D2D communication is an NCP, if TA granularity (unit: seconds) that the D2D transmitting terminal uses is 16·Ts, a value of a TA granularity bit (bit size=1) that is included in the SA message may be set to 0, and when TA granularity (unit: seconds) that the D2D transmitting terminal uses is ½ of an NCP length, a value of a TA granularity bit may be set to 1.

A fourth method is a method in which the base station notifies the D2D receiving terminal of terminal identifiers of D2D terminals that belong to a cell adjacent to the D2D receiving terminal and TA granularity of the adjacent cell through SIB or RRC signaling and in which the D2D transmitting terminal includes and transmits a terminal identifier thereof in the SA message. According to the fourth method, the D2D receiving terminal receives the SA message and acquires a terminal identifier of the D2D transmitting terminal from the SA message. The D2D receiving terminal determines to which cell the D2D transmitting terminal belongs using the acquired terminal identifier and searches for TA granularity of the determined cell. The D2D receiving terminal uses the found TA granularity when receiving D2D data.

Hereinafter, transmitting timing in mode 2 communication will be described.

In mode 2 communication, because the D2D transmitting terminal itself determines a transmitting resource, the D2D transmitting terminal may perform D2D transmission even in an RRC_IDLE state as well as an RRC_CONNECTED state. The terminal in an RRC_CONNECTED state can receive signaling of base station TA from the base station. However, the terminal in an RRC_IDLE state cannot receive signaling of base station TA from the base station.

As described above, when the D2D transmitting terminal transmits D2D data at UL timing that is calculated using TA, upon receiving UL WAN of the base station, ICI may be prevented (or mitigated). Therefore, the terminal in an RRC_CONNECTED state uses UL timing when transmitting D2D data, and the terminal in an RRC_IDLE state uses DL timing when transmitting D2D data. Alternatively, the D2D transmitting terminal may use DL timing when transmitting D2D data regardless of UL WAN receiving performance (or regardless of an RRC state). A method of using one of a former method (method of differently determining D2D transmitting timing according to an RRC state) and a latter method (method of determining D2D transmitting timing regardless of an RRC state) includes a method of predefining one to use among the former method and the latter method and a method of using one set by the base station among the former method and the latter method. Specifically, in the method of using one set by the base station, the base station may set which method to use among the former method and the latter method and may transmit setting information through SIB or RRC signaling. The D2D terminal, having received the setting information from the base station, may use one of the former method and the latter method according to setting of SIB or RRC signaling.

When the D2D transmitting terminal uses UL timing as D2D transmitting timing (e.g., the terminal in an RRC_CONNECTED state in the former method), the D2D transmitting terminal obtains TA information to include in an SA message with the same method as that in mode 1 communication. Specifically, the D2D transmitting terminal obtains TA information based on a UL timing adjustment value that is used for obtaining UL timing, and includes and transmits the obtained TA information in an SA message. When the D2D transmitting terminal uses DL timing as D2D transmitting timing (e.g., the terminal in an RRC_IDLE state in the former method or the terminal in the latter method), the D2D transmitting terminal includes and transmits TA information that is set to 0 in the SA message.

As in mode 1 communication, in mode 2 communication, the D2D transmitting terminal may differently set D2D data transmitting timing according to a CP length difference between D2D communication and WAN communication. Specifically, when CP lengths of D2D communication and WAN communication are the same, the D2D transmitting terminal sets D2D data transmitting timing to PUSCH timing. When CP lengths of D2D communication and WAN communication are different, the D2D transmitting terminal sets D2D data transmitting timing to TA indication UL timing that is obtained based on TA indication within the SA message. Specifically, as in mode 1 communication, TA indication UL timing is a time that is advanced by (TA indication value×TA granularity+N_TA_offset1)×Ts from SA transmitting timing (or DL timing). In both cases (a case in which CP lengths are the same and a case in which CP lengths are different), the D2D transmitting terminal may set TA indication transmitted through the SA message to a value closest to PUSCH timing. Specifically, as in mode 1 communication, the D2D transmitting terminal may select a value closest to an N_TA value that is used for calculating PUSCH timing among TA indication candidates that can be included in the SA message. More specifically, the D2D transmitting terminal may calculate (a value of TA indication candidate×TA granularity) for TA indication candidates, determine a value closest to an N_TA value that is used for calculating PUSCH timing among calculated values, and include a TA indication candidate that is used for the determined value in the SA message. Alternatively, the D2D transmitting terminal may determine TA indication using the Equation 1 described above.

In mode 2 communication, the D2D receiving terminal may be a partial-coverage terminal or an out-of-coverage terminal. Therefore, when the D2D receiving terminal cannot acquire TA granularity information from SIB or RRC signaling of the base station, the D2D receiving terminal may not interpret or may misinterpret TA that is applied to the D2D transmitting terminal. In order to resolve this, the D2D transmitting terminal may include and transmit TA granularity information thereof in the SA message, similar to mode 1 communication, in order to notify all D2D receiving terminals of TA granularity thereof. The D2D receiving terminal may interpret TA indication that is included in the SA message without an error using TA granularity information that is included in the SA message. Alternatively, as another method, the D2D transmitting terminal may include and transmit TA granularity information thereof in a D2D synchronization channel (e.g., a Physical D2D Synchronization Channel (PD2DSCH) or a Physical Sidelink Broadcast Channel (PSBCH)) used for propagating synchronization to a partial-coverage terminal or an out-of-coverage terminal. The D2D receiving terminal may acquire TA granularity information of the D2D transmitting terminal from the D2D synchronization channel.

Figure 3:
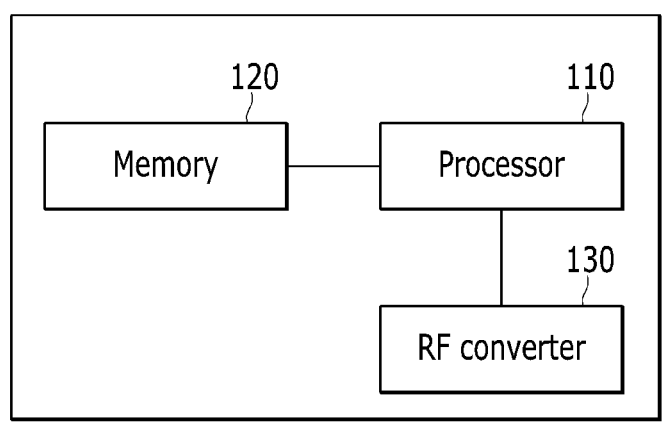
FIG. 3 is a block diagram illustrating a configuration of a terminal according to an exemplary embodiment of the present invention.

FIG. 3 is a block diagram illustrating a configuration of a terminal 100 according to an exemplary embodiment of the present invention. The D2D transmitting terminal and D2D receiving terminal described above may be formed equally/similarly to the terminal 100.

The terminal 100 includes a processor 110, a memory 120, and a Radio Frequency (RF) converter 130.

The processor 110 may be formed to implement a function, a procedure, and a method that are related to an exemplary embodiment of the present invention. Specifically, the processor 110 may be formed to implement a function, a procedure, and a method that are related to the D2D transmitting terminal that is described in this specification. Alternatively, the processor 110 may be formed to implement a function, a procedure, and a method that are related to the D2D receiving terminal that is described in this specification. Each configuration of the terminal 100 may be executed by the processor 110.

The memory 120 is connected to the processor 110 and stores various information that is related to operation of the processor 110.

The RF converter 130 is connected to the processor 110 and transmits or receives a wireless signal. The terminal 100 may have a single antenna or multiple antennas.

Figure 4:
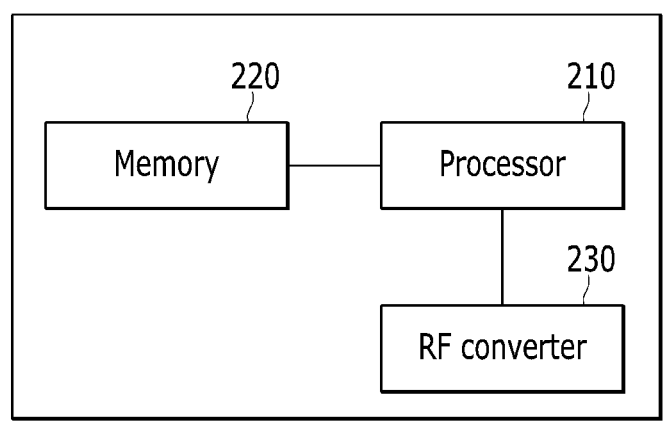
FIG. 4 is a block diagram illustrating a configuration of a base station according to an exemplary embodiment of the present invention.

FIG. 4 is a block diagram illustrating a configuration of a base station 200 according to an exemplary embodiment of the present invention.

The base station 200 includes a processor 210, a memory 220, and an RF converter 230.

The processor 210 may be formed to implement a function, a procedure, and a method that are related to an exemplary embodiment of the present invention. Specifically, the processor 210 may be formed to implement a function, a procedure, and a method that are related to the base station that is described in this specification. Each configuration of the base station 200 may be executed by the processor 210.

The memory 220 is connected to the processor 210 and stores various information that is related to operation of the processor 210.

The RF converter 230 is connected to the processor 210 and transmits or receives a wireless signal. The base station 200 may have a single antenna or multiple antennas.

Figure 5:
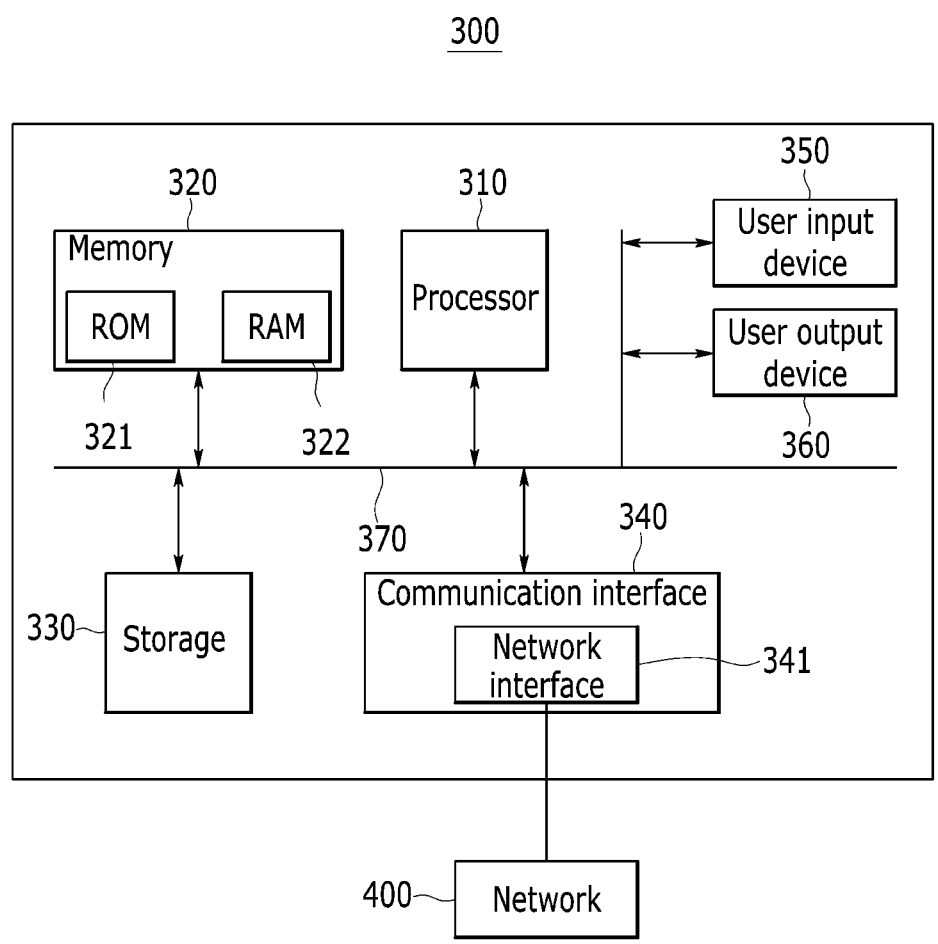
FIG. 5 is a block diagram illustrating a configuration of a computer system according to an exemplary embodiment of the present invention.

FIG. 5 is a block diagram illustrating a configuration of a computer system according to an exemplary embodiment of the present invention. An exemplary embodiment of the present invention may be implemented within a computer system (e.g., a computer readable medium). As illustrated in FIG. 5, a computer system 300 may include at least one processor 310, memory 320, and storage 330. Further, the computer system 300 may include a communication interface 340. The communication interface 340 may include a network interface 341 that is connected to a network 400. The computer system 300 may further include a user input device 350 and a user output device 360. Respective elements 310-360 may communicate through a bus 370.

The processor 310 may be a Central Processing Unit (CPU) or a semiconductor device that executes processing instructions that are stored at the memory 320 or the storage 330. The memory 320 and the storage 330 may include various forms of volatile or nonvolatile storage media. For example, the memory 320 may include a Read-Only Memory (ROM) 321 and a Random Access Memory (RAM) 322.

Therefore, an exemplary embodiment of the present invention may be implemented with a computer implemented method or a non-transitory computer readable medium with computer executable instructions stored thereon. In an exemplary embodiment of the present invention, when computer executable instructions are executed by the processor 310, the computer executable instructions may perform a method according to at least one aspect of the invention.

According to an exemplary embodiment of the present invention, when a resource for D2D communication and a resource for cellular communication are multiplexed, by adjusting transmitting timing of D2D communication, performance of D2D communication and cellular communication can be improved.

Further, according to an exemplary embodiment of the present invention, when a D2D transmitting terminal and a D2D receiving terminal belong to different cells, the D2D receiving terminal can acquire Timing Advance (TA) granularity (or timing adjustment step size) information that is used by the D2D transmitting terminal.

Further, according to an exemplary embodiment of the present invention, in mode 1 communication or mode 2 communication, by applying Uplink (UL) timing according to whether the difference exists in Cyclic Prefix (CP) lengths of D2D communication and Wide Area Network (WAN) communication, D2D data reception and UL WAN reception performance can be improved.

Further, according to an exemplary embodiment of the present invention, in mode 2 communication, by applying appropriate transmitting timing according to a Radio Resource Control (RRC) state of a terminal, D2D data reception and UL WAN receiving performance can be improved.

Further, according to an exemplary embodiment of the present invention, when a partial-coverage or out-of-coverage terminal receives D2D communication, by acquiring TA granularity of the D2D transmitting terminal, D2D receiving performance can be prevented from being degraded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A Device to Device (D2D) communication method in which a first terminal directly communicates with a second terminal, the D2D communication method comprising:
   receiving a first Timing Advance (TA) value from a base station;
   including a second TA value that is obtained based on the first TA value in a Scheduling Assignment (SA) signal;
   transmitting the SA signal to the second terminal at downlink (DL) timing for receiving a downlink signal of the base station in cellular communication; and transmitting, when a length of a Cyclic Prefix (CP) that is set for the D2D communication and a length of a CP that is set for the cellular communication are different, data of the D2D communication to the second terminal at first timing that is obtained by applying the second TA value to the DL timing.

2. The D2D communication method of claim 1, further comprising transmitting, when a CP length for the D2D communication and a CP length for the cellular communication are the same, data of the D2D communication to the second terminal at second timing that is obtained by applying the first TA value to the DL timing.

3. The D2D communication method of claim 1, wherein a timing adjustment step size for a first cell is the same as a timing adjustment step size for a second cell, even if the first cell to which the first terminal belongs and the second cell to which the second terminal belongs have different cell coverage.

4. The D2D communication method of claim 1, wherein the transmitting of the SA signal comprises including a first timing adjustment step size that is used by the first terminal in the SA signal.

5. The D2D communication method of claim 4, wherein the including of a first timing adjustment step size comprises setting a value of 1 bit that is included in the SA signal to a value representing the first timing adjustment step size.

6. The D2D communication method of claim 5, wherein the first timing adjustment step size is one of 16 multiplied by a sampling time and ½ of a normal CP length, when the CP for the D2D communication is the normal CP, and
the first timing adjustment step size is one of ½ of an extended CP length and ¾ of an extended CP length, when the CP for the D2D communication is the extended CP having a longer length than that of the normal CP.

7. The D2D communication method of claim 1, further comprising transmitting a cell-specific reference signal for demodulating the SA signal to the second terminal,
wherein a timing adjustment step size of a cell to which the first terminal belongs is transmitted to the second terminal by the base station.

8. The D2D communication method of claim 1, wherein the transmitting of the SA signal comprises including a terminal identifier of the first terminal that belongs to the first cell in the SA signal,
wherein terminal identifiers of terminals that belong to the first cell and a timing adjustment step size of a first cell are transmitted to the second terminal by the base station.

9. The D2D communication method of claim 1, wherein the bit number representing the second TA value is smaller than the bit number representing the first TA value.

10. The D2D communication method of claim 1, further comprising receiving allocation of a resource for transmitting the SA signal and a resource for transmitting data of the D2D communication from the base station.

11. The D2D communication method of claim 1, wherein the including of a second TA value comprises:
calculating a first timing adjustment value that is used for obtaining timing for transmitting a Physical Uplink Shared Channel (PUSCH) based on the first TA value; and
obtaining the second TA value using Equation 1:

$$TA2 = \text{floor}(N\_TA/TAS) \quad \text{[Equation 1]}$$

(floor( ): a rounding down function, N_TA: the first timing adjustment value, TAS: a timing adjustment step size used by the first terminal and having a unit of a sampling time, TA2: the second TA value).

12. A Device to Device (D2D) communication method in which a first terminal directly communicates with a second terminal, the D2D communication method comprising:
selecting a first resource for transmitting a Scheduling Assignment (SA) signal and a second resource for transmitting data of the D2D communication among resources;
setting, when first timing for transmitting data of the D2D communication is set to downlink (DL) timing for receiving a downlink signal of a base station in cellular communication, a first Timing Advance (TA) value that is included in the SA signal to 0; and
transmitting the SA signal to the second terminal using the first resource.

13. The D2D communication method of claim 12, further comprising setting the first timing to the DL timing, when a Radio Resource Control (RRC) state of the first terminal is an RRC idle state as well as when a RRC state of the first terminal is an RRC connected state.

14. The D2D communication method of claim 12, further comprising:
setting, when an RRC state of the first terminal is an RRC connected state, the first timing to timing that is obtained by applying a first timing adjustment value to the DL timing; and
setting, when an RRC state of the first terminal is an RRC idle state, the first timing to the DL timing.

15. The D2D communication method of claim 14, wherein the setting of the first timing to timing that is obtained by applying the first timing adjustment value to the DL timing comprises:
calculating, when a Cyclic Prefix (CP) length for the D2D communication and a CP length for the cellular communication are the same, the first timing adjustment value for obtaining Physical Uplink Shared Channel (PUSCH) transmitting timing based on a second TA value that is received from the base station; and
calculating the first TA value based on the first timing adjustment value.

16. The D2D communication method of claim 14, wherein the setting of the first timing to timing that is obtained by applying the first timing adjustment value to the DL timing comprises:
calculating, when a CP length for the D2D communication and a CP length for the cellular communication are different, a second timing adjustment value for obtaining PUSCH transmitting timing based on a second TA value that is received from the base station;
calculating the first TA value based on the second timing adjustment value; and
calculating the first timing adjustment value based on the first TA value.

17. The D2D communication method of claim 12, wherein the transmitting of the SA signal comprises including a first timing adjustment step size that is used by the first terminal in the SA signal.

18. The D2D communication method of claim 12, further comprising including a first timing adjustment step size that is used by the first terminal in a synchronization channel of the D2D communication.

19. A Device to Device (D2D) communication method in which a first terminal directly communicates with a second terminal, the D2D communication method comprising:

receiving a Scheduling Assignment (SA) signal comprising a first Timing Advance (TA) value from the second terminal at first timing;

acquiring a first timing adjustment step size from at least one of a first signal that is received through System Information Block (SIB) or Radio Resource Control (RRC) signaling of a base station, the SA signal, and a D2D communication synchronization channel that is received from the second terminal;

calculating second timing using the first timing, the first TA value, and the first timing adjustment step size; and receiving data of the D2D communication at the second timing.

20. The D2D communication method of claim 19, wherein the acquiring of a first timing adjustment step size comprises:

determining, when a Cyclic Prefix (CP) for the D2D communication is a normal CP, a value corresponding to a value of 1 bit that is included in the SA signal among 16 multiplied by a sampling time and ½ of the normal CP length to the first timing adjustment step size having a unit of seconds; and determining, when a CP for the D2D communication is an extended CP having a longer length than that of the normal CP, a value corresponding to a value of 1 bit that is included in the SA signal among ½ of the extended CP length and ¾ of the extended CP length to the first timing adjustment step size having a unit of seconds.

* * * * *